(12) United States Patent
Gullino et al.

(10) Patent No.: US 9,694,838 B2
(45) Date of Patent: Jul. 4, 2017

(54) TROLLEY FOR CONVEYING CONTAINERS FOR PIECES OR COMPONENTS IN AN INDUSTRIAL PLANT

(71) Applicant: Comau S.p.A., Grugliasco (Turin) (IT)

(72) Inventors: Eugenio Gullino, Grugliasco (IT); Roberto Ducato, Grugliasco (IT)

(73) Assignee: COMAU S.P.A., Grugliasco (Turin) (IT)

( * ) Notice: Subject to any disclaimer, the term of this patent is extended or adjusted under 35 U.S.C. 154(b) by 47 days.

(21) Appl. No.: 14/762,849

(22) PCT Filed: Jan. 29, 2014

(86) PCT No.: PCT/IB2014/058625
§ 371 (c)(1),
(2) Date: Jul. 23, 2015

(87) PCT Pub. No.: WO2014/122559
PCT Pub. Date: Aug. 14, 2014

(65) Prior Publication Data
US 2015/0360707 A1    Dec. 17, 2015

(30) Foreign Application Priority Data
Feb. 6, 2013    (EP) .................................... 13154131

(51) Int. Cl.
*B62D 13/04*    (2006.01)
*B62B 3/02*    (2006.01)
(Continued)

(52) U.S. Cl.
CPC ................ *B62B 3/02* (2013.01); *B62B 3/001* (2013.01); *B62B 3/10* (2013.01); *B62B 5/0079* (2013.01);
(Continued)

(58) Field of Classification Search
CPC  B62B 3/001; B62B 3/007; B62B 3/02; B62B 2202/10; B62B 2202/12;
(Continued)

(56) References Cited

U.S. PATENT DOCUMENTS 2,470,496 A  *  5/1949  Krilanovich ............ B62B 3/001
                                                180/410
2,651,526 A  *  9/1953  Eubanks ................ B62D 13/04
                                                280/102
(Continued)

FOREIGN PATENT DOCUMENTS

DE    20 2004 001 688 U1    6/2004
DE    20 2008 007 158 U1    9/2008
(Continued)

OTHER PUBLICATIONS

Notification of Transmittal of the International Search Report and the Written Opinion of the International Searching Authority, or Declaration dated Jul. 30, 2014.

*Primary Examiner* — Emma K Frick
(74) *Attorney, Agent, or Firm* — Young Basile Hanlon & MacFarlane, P.C.

(57) ABSTRACT

A selectively extendable length trolley for supporting and conveying various sized and configured containers for pieces or components in an industrial plant. The trolley includes an adjustable length trolley structure, front and rear adjustable frames and locating supports for the containers that include side supports adjustable in position in a transverse direction, orthogonal to the longitudinal direction (L). A steering control unit (2) of the trolley (1) is articulated to the front frame (32) and operates in such a way that the front wheel unit and the rear wheel unit are made to oscillate in opposite directions to keep the wheels aligned with the curved path to be followed. In a preferred embodiment, the (Continued)

front and rear adjustable frames are T-shaped providing an open or free space at the two sides of the central structure of the trolley.

13 Claims, 11 Drawing Sheets

(51) Int. Cl.
| | |
|---|---|
| *B62B 3/00* | (2006.01) |
| *B62B 3/10* | (2006.01) |
| *B62B 63/06* | (2006.01) |
| *B62D 7/02* | (2006.01) |
| *B62B 5/00* | (2006.01) |
| *B62D 1/14* | (2006.01) |

(52) U.S. Cl.
CPC ............... *B62D 1/14* (2013.01); *B62D 7/026* (2013.01); *B62D 13/04* (2013.01); *B62D 63/061* (2013.01); *B62B 2202/10* (2013.01); *B62B 2203/44* (2013.01); *B62B 2206/02* (2013.01); *B62B 2301/06* (2013.01)

(58) Field of Classification Search
CPC ............ B62B 2202/62; B62B 2203/24; B62B 2203/44; B62B 2206/02; B62B 2206/04; B62B 2301/06; B62D 13/04
See application file for complete search history.

(56) References Cited

U.S. PATENT DOCUMENTS

| | | | | | |
|---|---|---|---|---|---|
| 2,730,373 | A * | 1/1956 | Blevins | ................. | B62B 5/0083 280/35 |
| 2,834,605 | A * | 5/1958 | McCollough | ........... | B62B 3/001 180/410 |
| 2,885,090 | A * | 5/1959 | Forman | ................... | A47B 45/00 211/175 |
| 3,077,354 | A * | 2/1963 | Rateau | ...................... | B62D 7/02 26/15 R |
| 3,820,811 | A * | 6/1974 | Lapham | .................. | B62D 59/04 280/408 |
| 3,934,895 | A * | 1/1976 | Fox | ........................... | B62B 1/02 190/18 A |
| 3,955,511 | A * | 5/1976 | Bak | ........................ | A47B 45/00 108/137 |
| 4,004,820 | A * | 1/1977 | Weber | .................... | B62D 7/026 280/103 |
| 4,166,638 | A * | 9/1979 | De Prado | .............. | B62B 5/0083 280/638 |
| 4,796,909 | A * | 1/1989 | Kirkendall | ................ | B62B 3/02 180/906 |
| 4,934,720 | A * | 6/1990 | Dobron | ................. | B62B 5/0083 108/56.1 |
| 4,934,726 | A * | 6/1990 | Daenens | ................ | B62D 13/04 280/103 |
| 4,976,448 | A * | 12/1990 | Wickersham | ............. | B62B 1/10 280/47.2 |
| 5,249,823 | A * | 10/1993 | McCoy | ..................... | B62B 3/02 280/144 |
| 5,465,996 | A * | 11/1995 | Wisz | .................... | A45C 13/385 280/35 |
| 5,599,031 | A * | 2/1997 | Hodges | ................. | B62B 5/0083 280/35 |
| 5,873,592 | A * | 2/1999 | Daenens | ................ | B62D 13/04 280/410 |
| 6,109,644 | A * | 8/2000 | Cox | ......................... | B62B 1/20 280/47.24 |
| 6,354,394 | B1 * | 3/2002 | Bauer-Nilsen | ......... | B62D 7/026 180/408 |
| 6,783,147 | B1 * | 8/2004 | Green, Sr. | ................. | B62B 1/20 280/47.26 |
| 6,923,468 | B1 * | 8/2005 | Barnett | ..................... | B62B 3/04 280/35 |
| 8,430,412 | B2 * | 4/2013 | Sanvido | .................. | B62B 3/001 280/47.11 |
| 8,857,832 | B2 * | 10/2014 | Smith | .................... | B62K 5/003 280/263 |
| 2004/0056444 | A1* | 3/2004 | Bidwell | .................. | B62B 3/001 280/99 |
| 2004/0239060 | A1* | 12/2004 | Faucher | ................... | A61G 7/05 280/47.11 |
| 2006/0108774 | A1* | 5/2006 | Raymond | ................. | B62B 3/02 280/651 |

FOREIGN PATENT DOCUMENTS

| | | |
|---|---|---|
| EP | 2305535 A1 | 4/2011 |
| EP | 2418137 A1 | 2/2012 |
| WO | 2010134038 A1 | 11/2010 |

* cited by examiner

TROLLEY FOR CONVEYING CONTAINERS FOR PIECES OR COMPONENTS IN AN INDUSTRIAL PLANT

BACKGROUND OF THE INVENTION

The present invention relates to trolleys for conveying containers for pieces or components in industrial plants, of the type comprising:
- a structure provided with a plurality of wheel units, pivotable about respective vertical axes;
- a trolley steering control unit located at a front end of the trolley and connected to the structure of the trolley orientably about a vertical axis that lies in the longitudinal median plane of the trolley;
- a transmission connecting said steering control unit of the trolley to at least two of said wheel units; and
- one or more locating supports arranged on said trolley structure for locating a piece container in position on said structure.

Trolleys of the type referred to above have been used for a long time in industrial plants. Normally, the structure of the trolley is designed according to the dimensions and the configuration of the containers that are to be conveyed and the weight to be conveyed. More frequently, in an industrial plant different types of containers for pieces and consequently different configurations of trolley are used, each dedicated to a particular type of container.

In the past, there have also been proposed trolleys without a steering device, but having a structure that is adjustable in length and width, designed to enable adaptation to containers of different dimensions. Trolleys of this type are disclosed, for example, in documents DE 20 2004 001 688 U1 and DE 20 2008 007 158 U1.

BRIEF SUMMARY OF THE INVENTION

The purpose of the present invention is to provide a steerable trolley of the type specified at the beginning of the present description, that can be used as a universal trolley that can be rapidly and easily adapted to containers of different sizes and that at the same time will have a simple and inexpensive structure.

With a view to achieving the above purpose, the subject of the invention is a trolley having all the characteristics that have been referred to in the Background section the present description and further characterized in that:
- said trolley structure is adjustable in length in the longitudinal direction of the trolley; and
- said locating supports include lateral locating supports that are adjustable in position along a transverse direction, orthogonal to said longitudinal direction, in such a way that said trolley can be adapted to piece containers having dimensions and/or configurations different both with reference to said longitudinal direction and with reference to said transverse direction,
said trolley structure comprising:
- a front frame and a rear frame, which are slidably mounted towards and away from each other along said longitudinal direction and can be blocked selectively at different positions, in which they are at different distances from each other, so as to define different lengths of said trolley in said longitudinal direction,
wherein said wheel units are carried by said front and rear adjustable frames;
wherein said steering control unit of the trolley is connected to said front frame; and
wherein said lateral locating supports are slidably mounted on said front and rear frames in said transverse direction and can be blocked in a plurality of different adjustment positions to adapt to different dimensions of container in the aforesaid transverse direction.

Preferably, the two front and rear frames are both slidably mounted on a common central structure, even though embodiments in which said frames are slidably mounted directly onto each other are not excluded.

Thanks to the aforesaid characteristics, the trolley of the invention has on the one hand a simple, inexpensive, and reliable structure, and on the other hand it is suited to being easily and rapidly transformed according to the dimensions of the container that it must convey, so that it can be used in an industrial plant, for example in a plant for the production of motor vehicles, as sole type of standard trolley, which can be adapted to the various configurations and dimensions of containers envisaged in the plant.

Additional and preferred characteristics of the trolley according to the invention are specified in the annexed dependent claims.

BRIEF DESCRIPTION OF THE SEVERAL VIEWS OF THE DRAWINGS

Further characteristics and advantages of the invention will emerge from the ensuing description, with reference to the annexed drawings, which are provided purely by way of non-limiting example and in which.

DETAILED DESCRIPTION OF THE INVENTION

Figure 1:
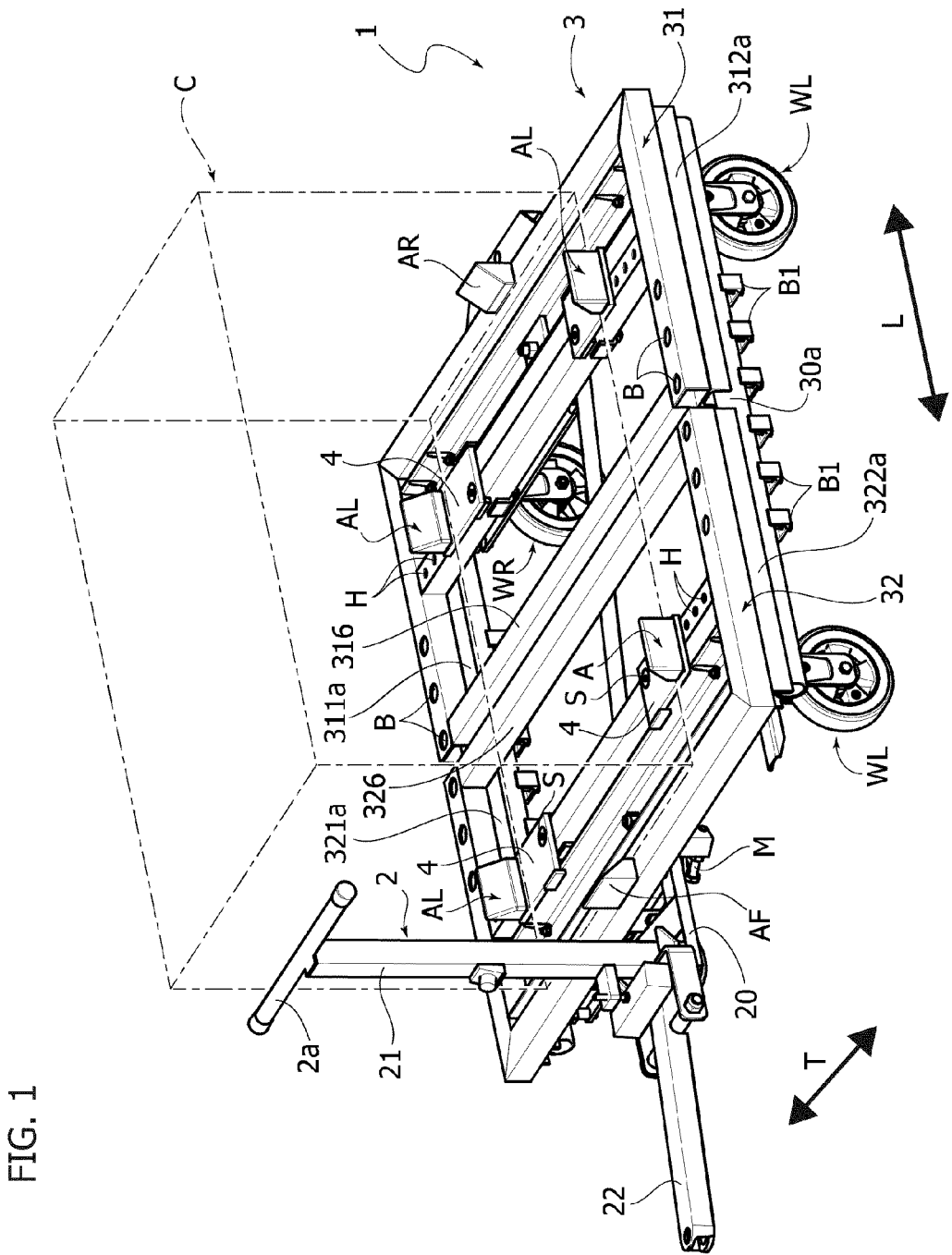
FIG. 1 is a perspective view of a first embodiment of a trolley according to the invention, in the configuration of minimum length.

With reference to FIGS. 1-8, number 1 generally designates a first embodiment of a trolley according to the present invention, designed to carry a container C (represented by a dashed line in FIG. 1) for conveying pieces or components in an industrial plant. According to the invention, the trolley 1 can be adapted easily and rapidly to containers of different dimensions and/or configurations so that it is suited to being used as single type of standard trolley in an industrial plant, for example, in a plant for the production of motor vehicles, even when containers for pieces of different dimensions and/or shapes are used in the aforesaid plant.

The structure of the trolley 1, generally designated by reference number 3, is adjustable in length in a longitudinal direction L of the trolley, since it comprises a central structure 30 on which a front frame 32 and a rear frame 31 are slidably mounted longitudinally. The front and rear frames can be blocked in different positions.

Figure 5:
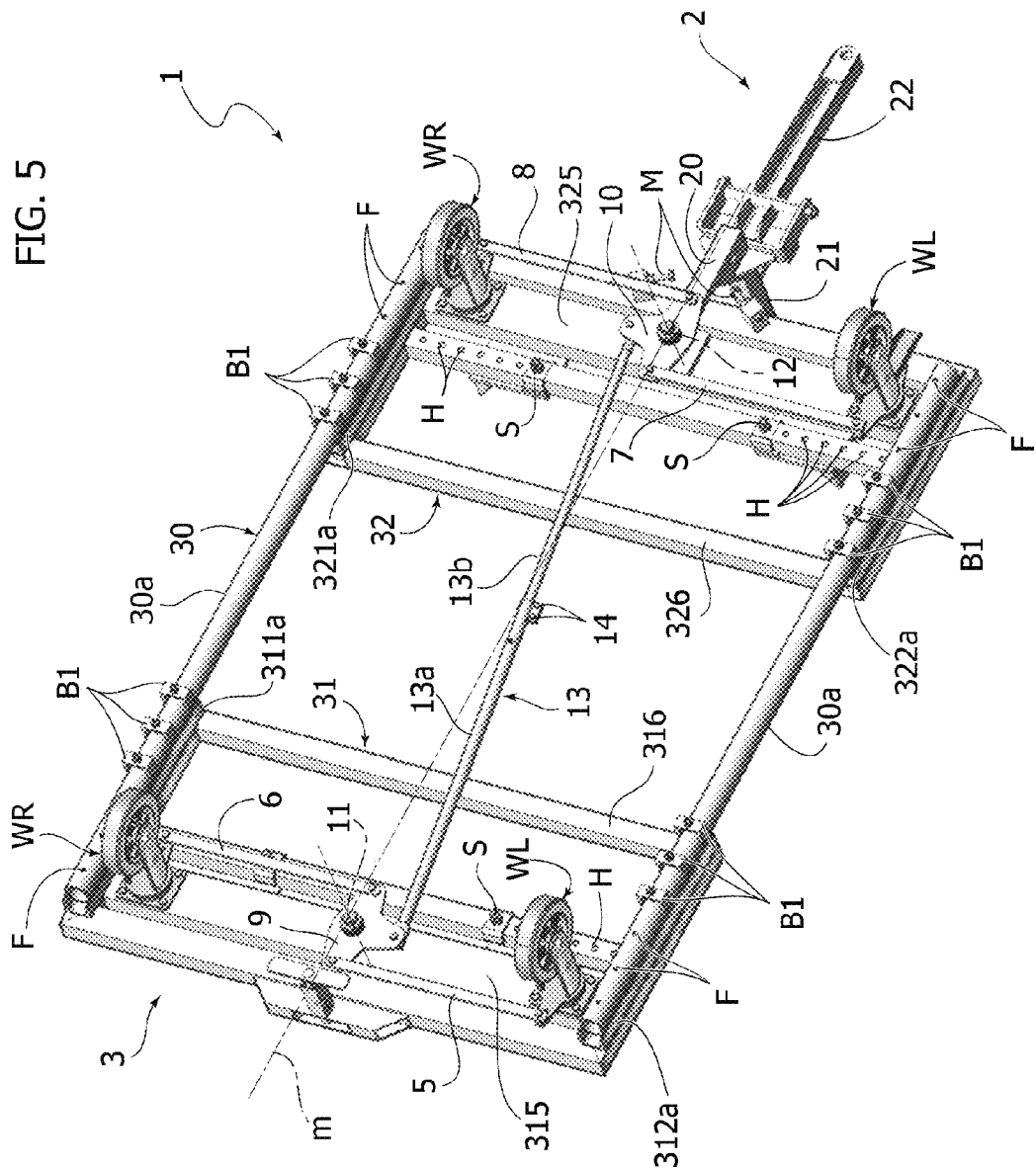
FIG. 5 is a perspective view from below of the trolley of FIG. 1, in the configuration of maximum extension.
Figure 6:
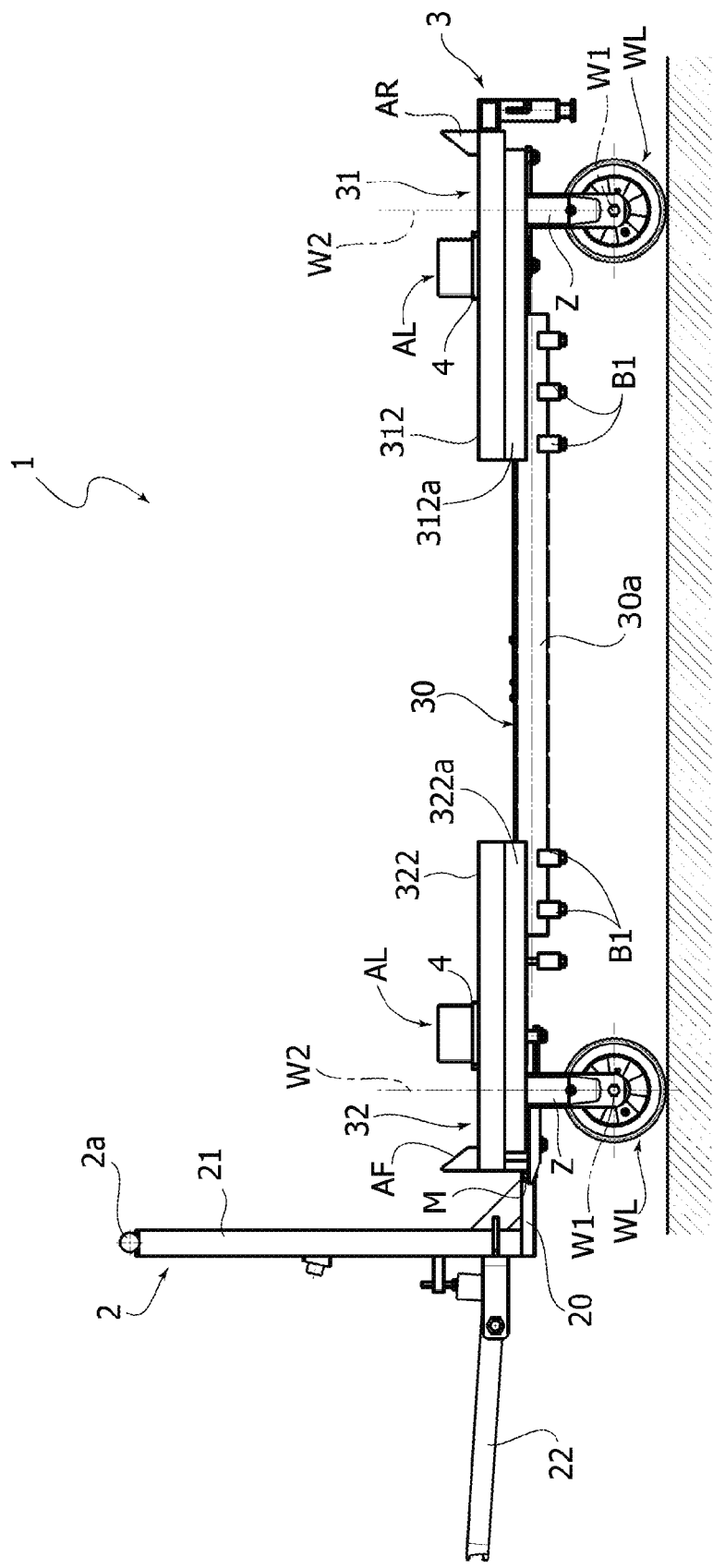
FIG. 6 is a side view of the trolley of FIG. 1 in the configuration of maximum extension illustrated in FIG. 5.

The adjustable frames 31, 32 carry two pairs of wheel units WL, WR on the two sides of the longitudinal median plane m of the trolley (FIG. 5). On one side, two wheel units WL are provided, which are pivotably mounted about respective vertical axes on the front and rear frames 31, 32. On the other side, two wheel units WR are provided, which are also pivotably mounted about respective vertical axes on the front and rear frames 31, 32.

In the case of the embodiment of FIGS. 1-8, the four wheel units WL, WR are all steering units in so far as they are connected by a transmission (which will be described in greater detail in the following) to a steering control unit 2 of the trolley, provided with a handlebar 2a.

As will be seen in the following, for the purposes of the present invention it is in any case sufficient for the steering control unit 2 to be connected only to two of the wheel units WL, WR, and precisely only to a front wheel unit, carried by the front frame 32, and a rear wheel unit, carried by the rear frame 31. In this case, the two steering wheel units can be located on one and the same side or on opposite sides with respect to the longitudinal plane m of the trolley.

Moreover, for each side of the container C the trolley comprises two side supports AL, carried one by the front frame 32 and the other by the rear frame 31. There are moreover provided a front support AF and a rear support AR rigidly connected to the front and rear frames 32, 31.

In accordance with the present invention, the lateral locating supports AL are adjustable in position in a transverse direction T, orthogonal to the longitudinal direction L.

Thanks to the possibility of adjusting the length of the trolley in the longitudinal direction L and the position of the lateral locating supports AL in the transverse direction T, the trolley according to the invention can be used as universal trolley, which can be adapted to different configurations and dimensions of containers.

In the case of the embodiment illustrated in FIGS. 1-8, the structure 3 of the trolley comprises a central structure 30 including two longitudinal elements 30a (see, in particular, FIG. 5) with circular cross section and independent of one another, and a front frame 32 and a rear frame 31, which are slidably mounted on the longitudinal elements 30a towards and away from each other and can be blocked in any of a plurality of positions.

Figure 4:
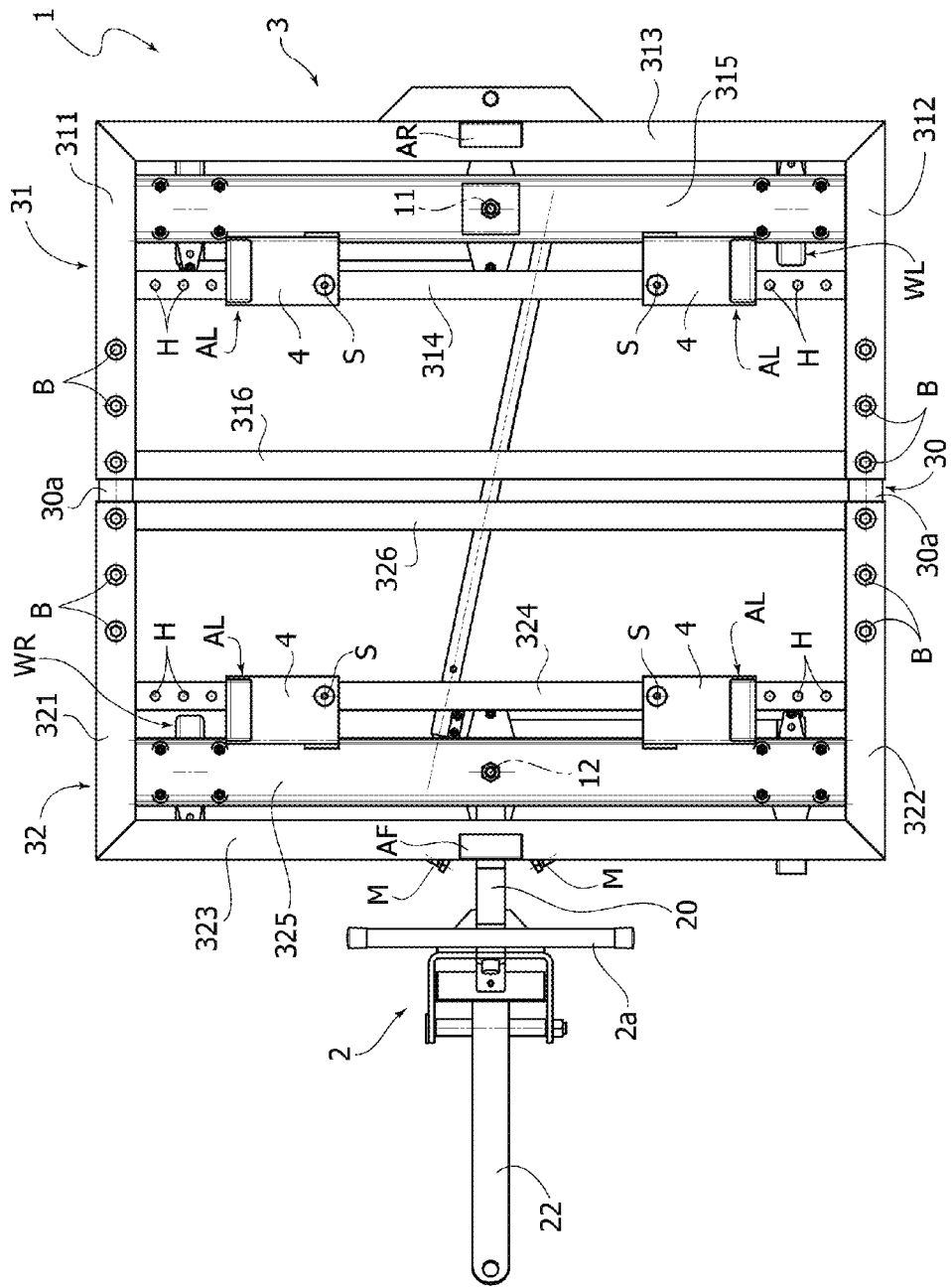
Figure 7:
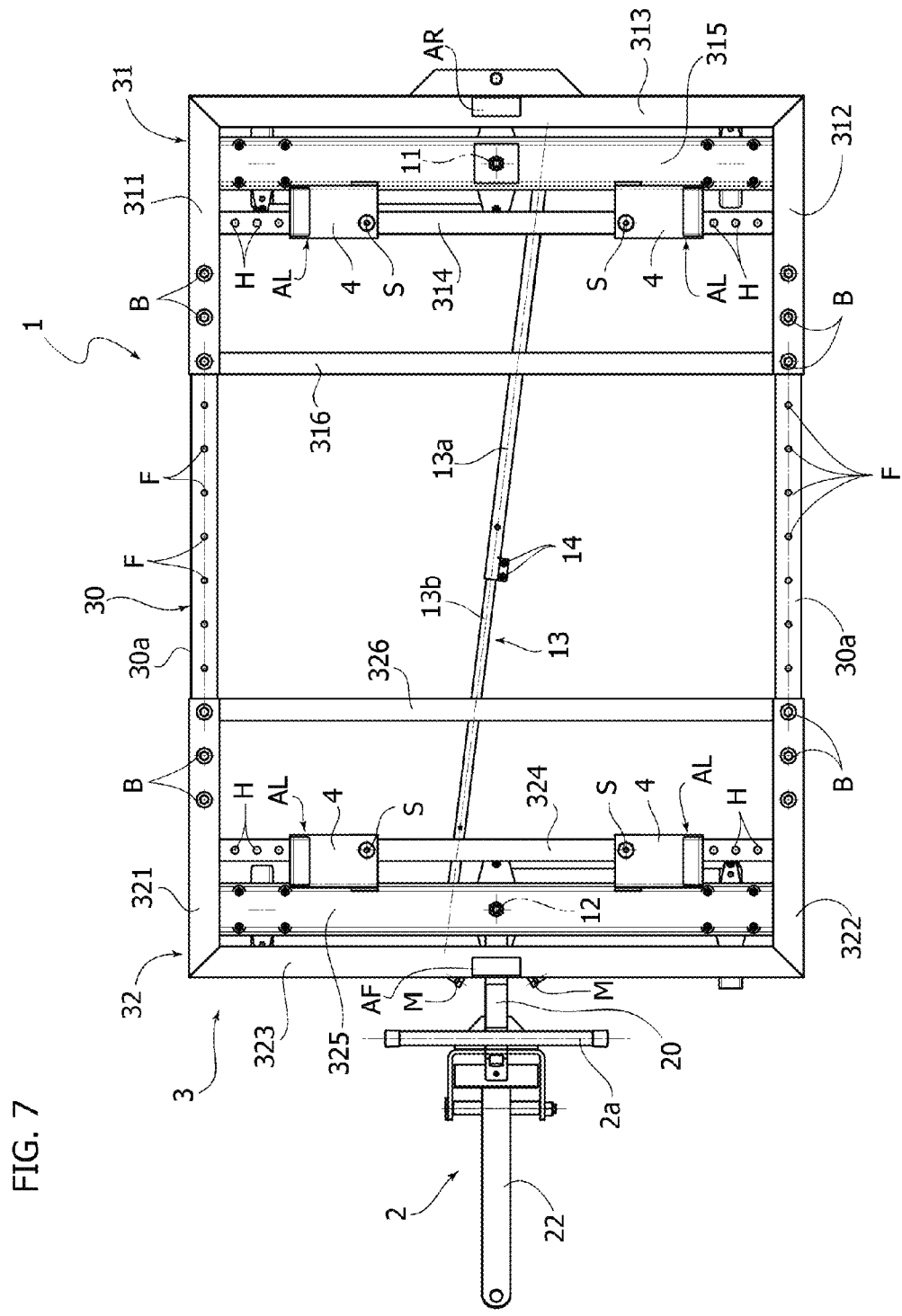
FIG. 7 is a top plan view of the trolley of FIG. 1 in the configuration of FIGS. 5 and 6.
Figure 8:
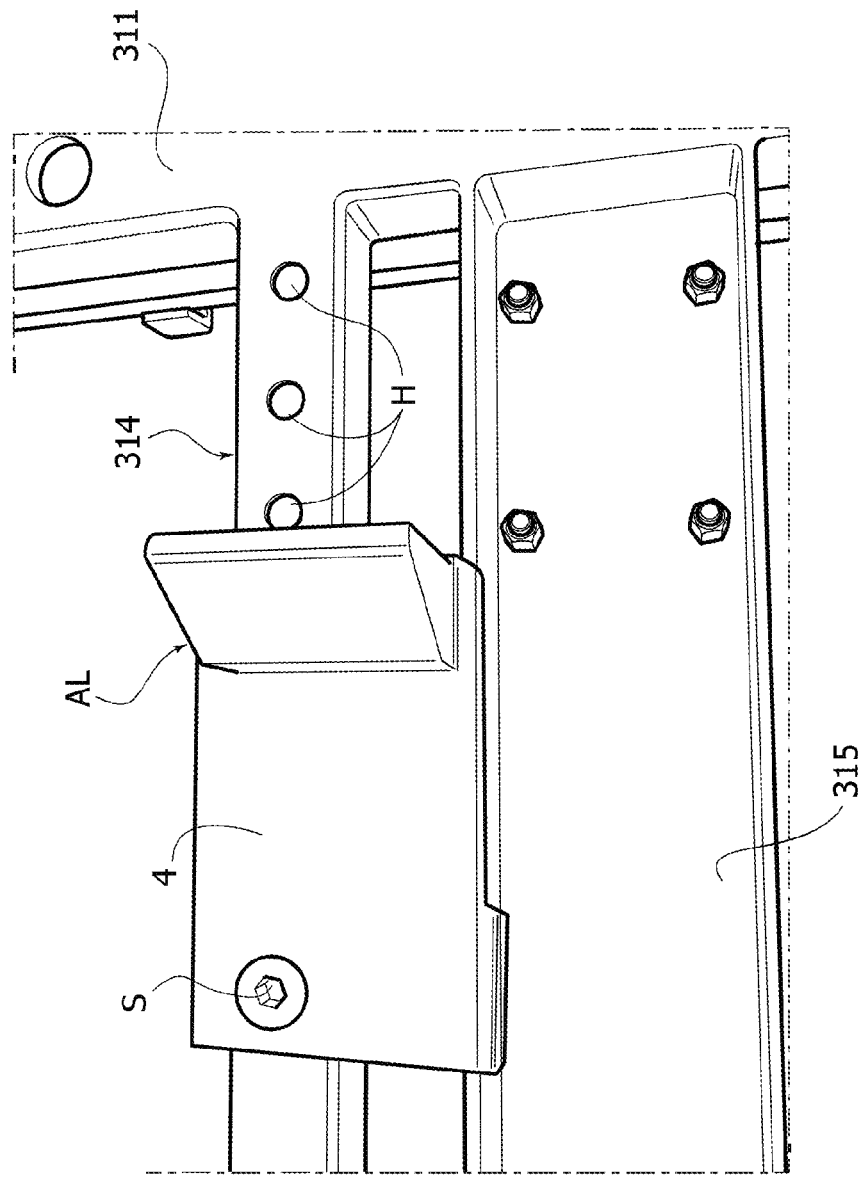
FIG. 8 is a perspective view at an enlarged scale of the detail of a locating support slidably mounted on a cross member of one of the two adjustable frames forming part of the structure of the trolley of FIG. 1.

The two slidably mounted frames 31, 32 each have two longitudinal arms 311, 312 and 321, 322, joined by cross members 313, 314, 315, 316 and 323, 324, 325, 326 (see, in particular, FIGS. 4 and 7).

The longitudinal arms 311, 312 and 321, 322 of the two, front and rear, frames 32, 31 are slidably mounted, on opposite sides, on the two longitudinal elements 30a. For this purpose, fixed under the arms 311, 312 and 321, 322 are channels with C-shaped cross section, designated, respectively, by 311a, 312a and by 321a, 322a, slidably mounted on the elements 30a. Moreover, as may be clearly seen in FIGS. 3, 6 and 7, the elements 30a have a series of through holes F distributed with constant pitch. Associated to the channels 311a, 312a and 321a, 322a are bolts B. The bolts B are designed to engage selected holes F, tightening respective U-brackets B1 (see FIGS. 3 and 5) against the elements 30a, so as to clamp the two frames 30, 31 in any selected configuration.

Moreover, the cross members 314, 315 and 324, 325 of the two slidably mounted frames 31, 32 each support the two respective lateral locating supports AL so that they can slide in the direction T. Each locating support AL is provided with a base 4 in the form of a plate, with a through hole for engagement of a bolt S designed to engage any of a plurality of holes H distributed along said cross members 314, 324 so as to enable selection of the blocking position of each locating support AL in the transverse direction T.

Figure 2:
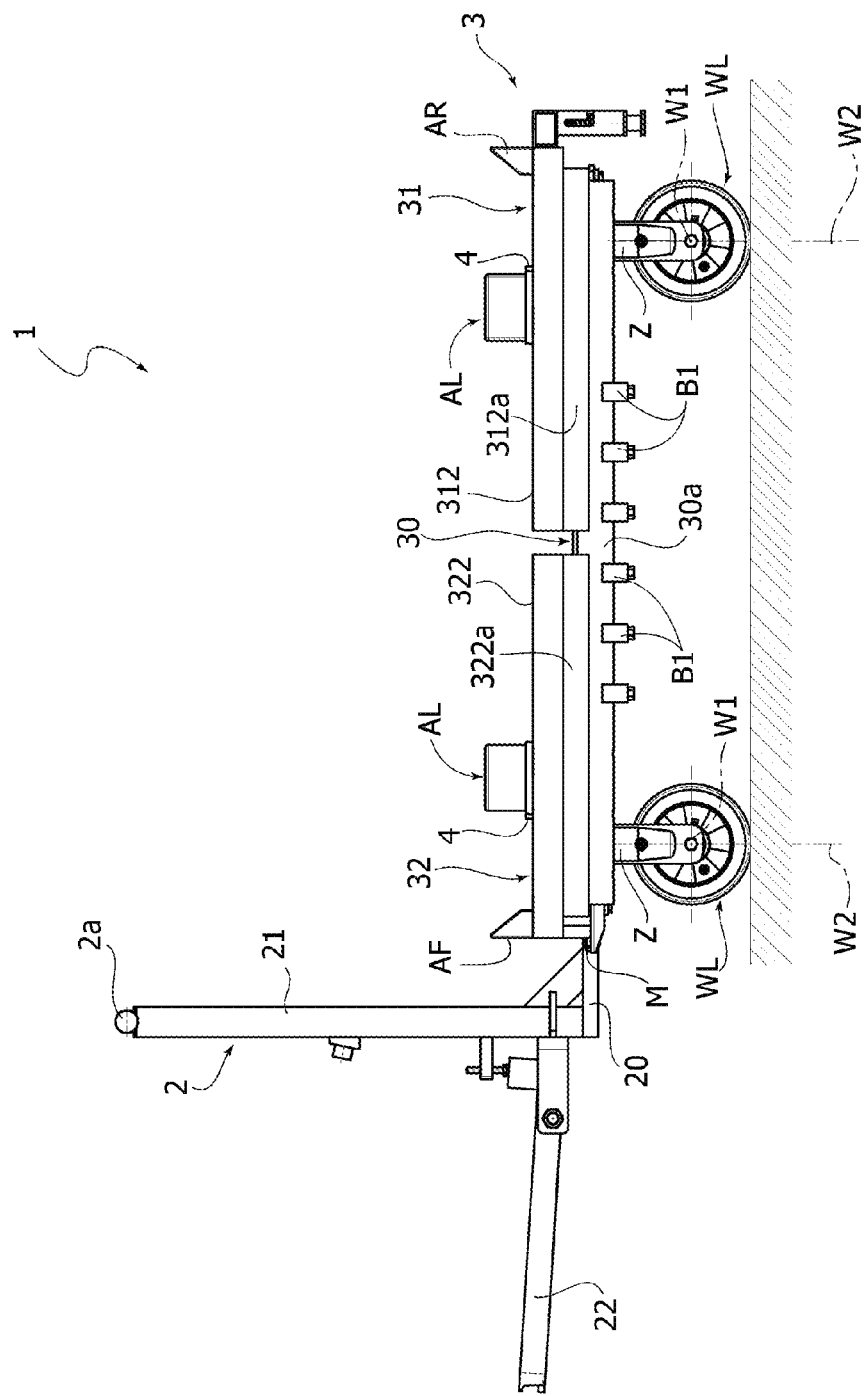
FIGS. 2-4 are a side view, a front view, and a top plan view, respectively of the trolley of FIG. 1.
Figure 3:
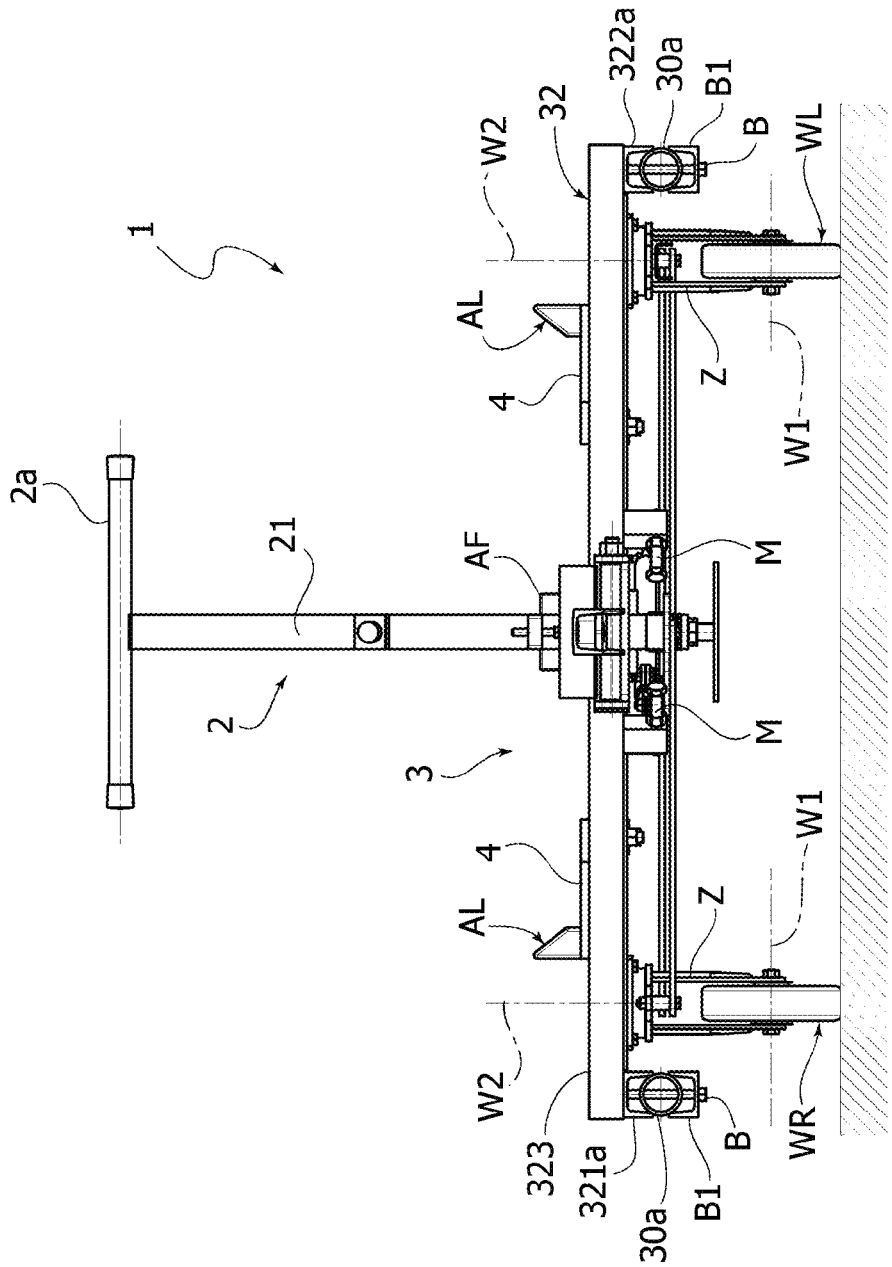

Each wheel unit WL, WR has, in the case illustrated, a single wheel (even though the possibility of two paired wheels is not excluded) freely rotatably supported about its axis W1 by a fork-shaped support Z (see, for example, FIGS. 2 and 3). Each fork-shaped support Z is pivotably mounted about a vertical axis on a plate anchored to the under surface of the respective cross member 315, 325.

As has already been mentioned, in the embodiment illustrated in FIGS. 1-8, all four wheel units WR, WL are steering wheel units, in so far as they are connected by a transmission to the steering control unit 2. With reference to FIG. 5, in the specific example the pivotable supports Z of the steering wheels WR and WL are connected by means of tie-rods 5, 6 and 7, 8 to a rear plate 9 and to a front plate 10 pivotably mounted under the cross members 315, 325 of the two frames 31, 32 about vertical axes 11, 12 lying in the longitudinal median plane m of the trolley. The plate 10 associated to the cross member 325 of the end frame 32 is rigidly connected to a structure 20 from which there rises an upright 21 forming part of the steering unit 2. The structure 20 co-operates with (adjustable) end-of-travel pins that limit the maximum angle of oscillation of the structure 20 (on the left and on the right) and consequently of the entire steering control unit. Also pivotably connected to the steering unit 2 is a longitudinal arm 22 for towing the trolley 1.

The two articulated plates 9, 10, which form part of the steering linkage described above, are moreover connected to one another by means of a diagonal tie-rod 13, of adjustable length that can consequently be adapted to the configuration chosen for the trolley. In the example illustrated, the diagonal tie-rod 13 has a telescopic structure, constituted by two coaxial tubes 13a, 13b which can be fastened to one another by means of bolts 14. As a result of the aforesaid arrangement, the tie-rod 13 causes a rotation of the rear plate 9, in a direction opposite to the direction of rotation of the front plate 10 imposed by the steering control unit 2. Consequently, during steering, the front and rear wheels of the trolley oscillate about the respective vertical axes in mutually opposite directions so as to keep each wheel aligned with the curved path to be followed.

As emerges clearly from the foregoing description, the trolley according to the invention can be adapted in an easy and rapid way to different configurations and dimensions of containers by adjusting the length of the structure of the trolley in the longitudinal direction L and adjusting the position of the locating supports A in the transverse direction T. Also the linkage of the steering device may be adapted accordingly. The characteristics of reconfigurability of the trolley according to the invention are obtained with a trolley structure that is as a whole simple and inexpensive.

Figure 9:
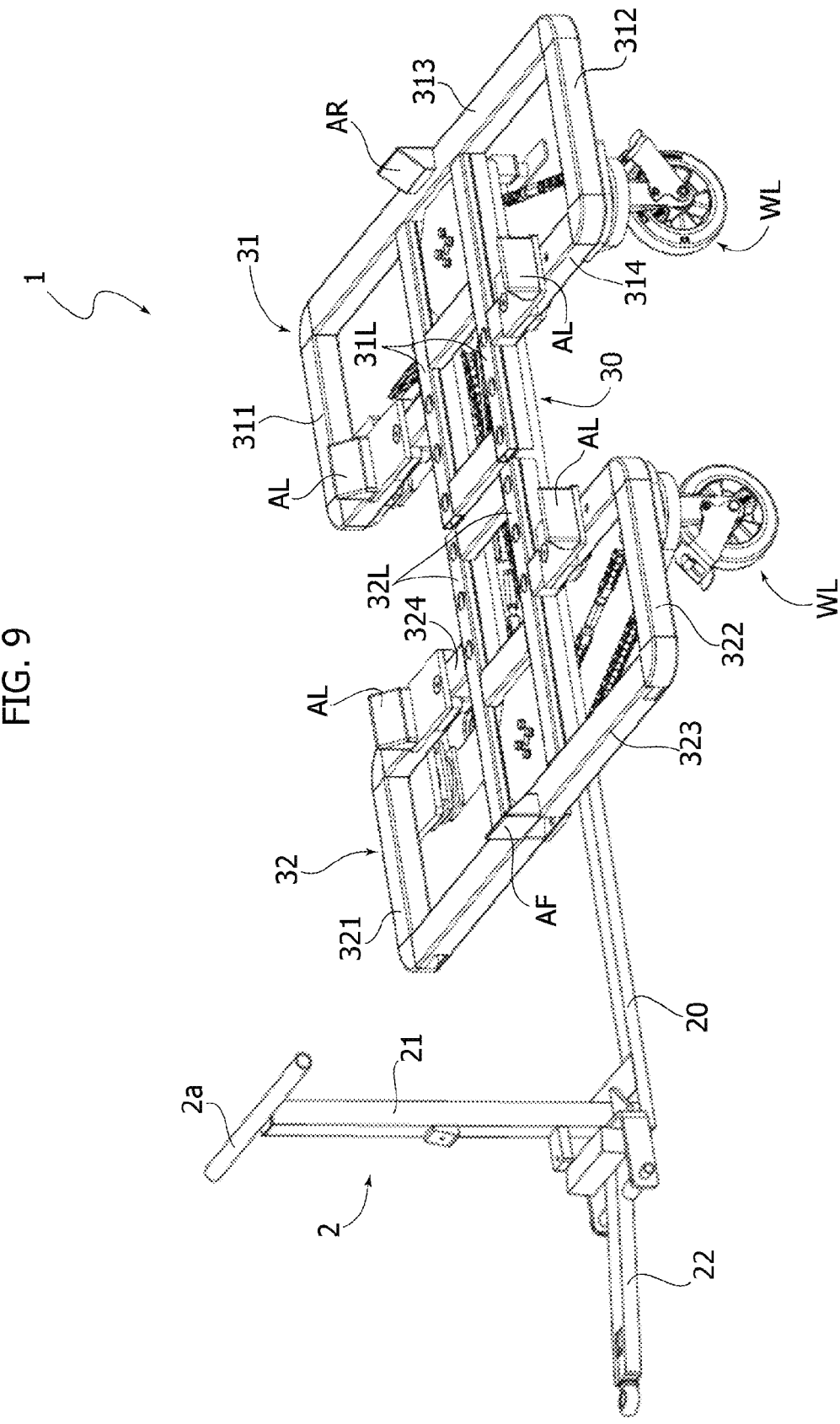
FIGS. 9-11 refer to a second and preferred embodiment of the invention, and are, respectively, two perspective views of the trolley in the configurations of minimum and maximum extension and a perspective view from below, which shows the transmission for controlling the steering wheels of the trolley.
Figure 10:
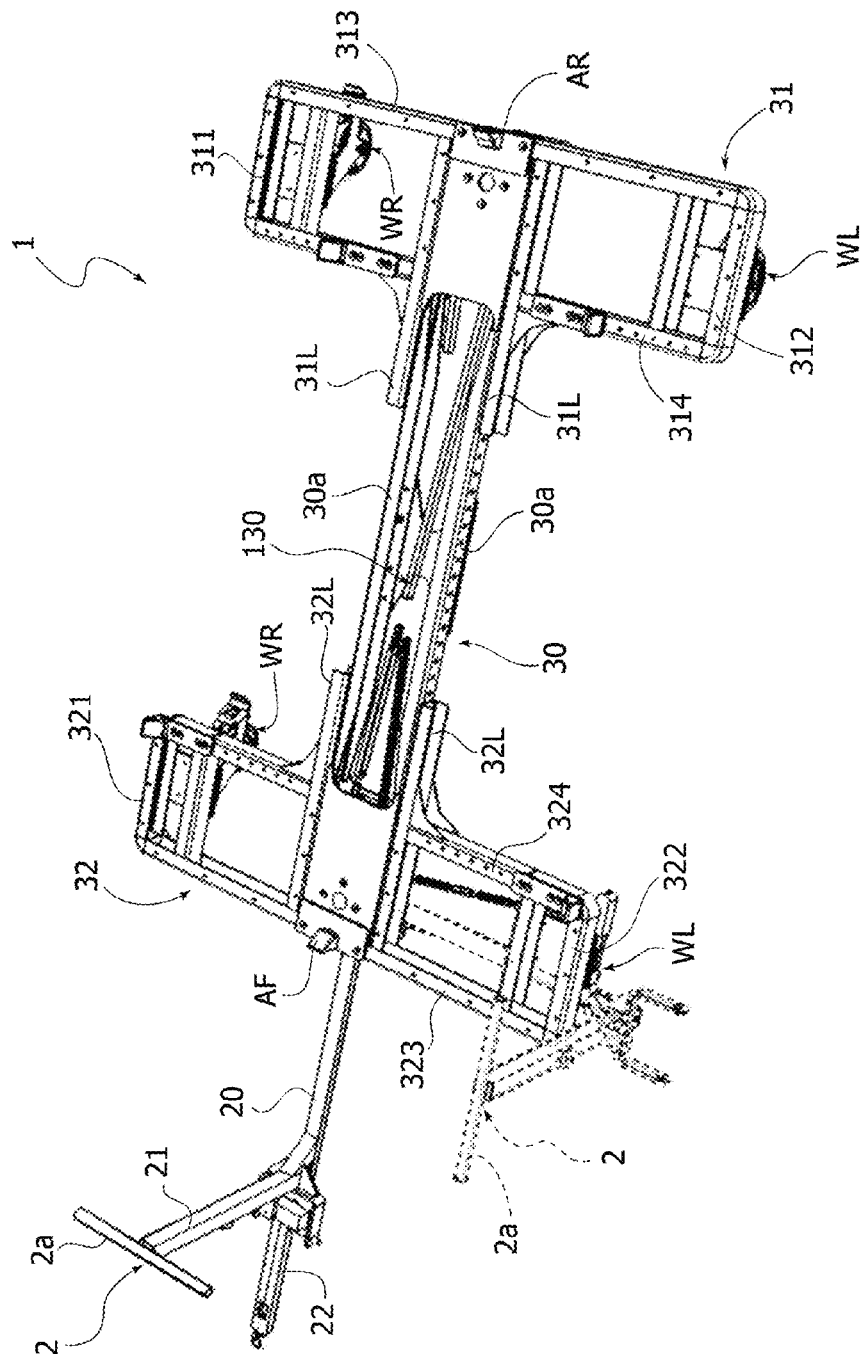
Figure 11:
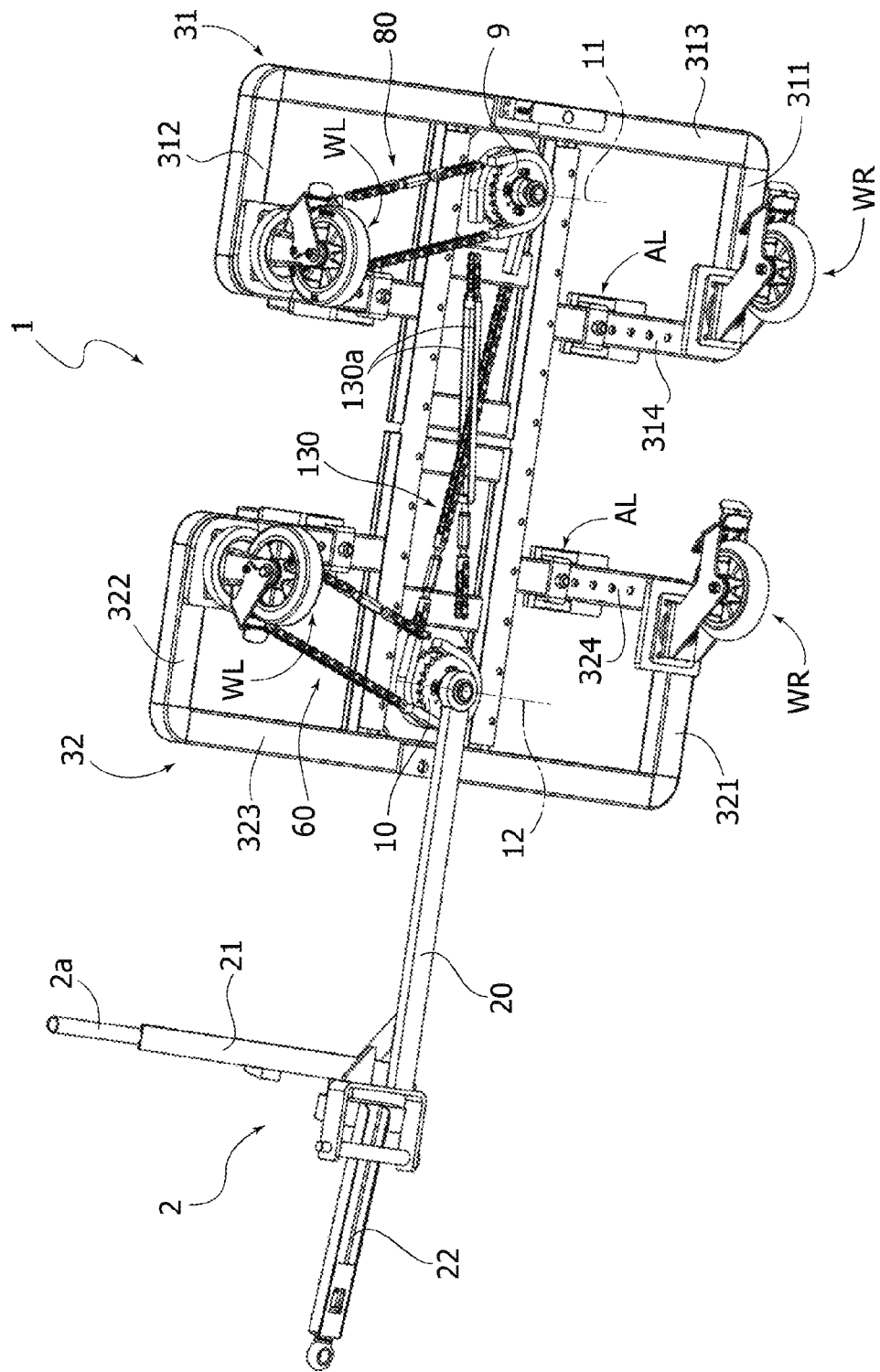

FIGS. 9-11 of the annexed drawings illustrate a second and preferred embodiment of the invention. In these drawings, the parts corresponding to those of FIGS. 1-8 are designated by the same reference numbers.

A first important difference from the embodiment of FIGS. 1-8 lies in the fact that in this case the cross members 313, 314 and 323, 324 of the two adjustable frames 31, 32 project at the two sides of respective longitudinal arms 31L, 32L that are slidably mounted on the longitudinal elements 30a of the central structure 30, in such a way that each of these adjustable frames has a general T-shaped configuration in plan view so as to define a free space at the two sides of the central structure 30 of the trolley, between the two heads of the T shapes of the adjustable frames. This space is advantageous in so far as it enables the operators to approach more closely the container carried on the trolley.

A further difference lies in that in this case just the left-hand wheels WL are controlled by the steering unit 2, whereas the right-hand wheels WR are freely pivotable. As already mentioned above, it is likewise possible to envisage that the two, front and rear, steering wheel units are on opposite sides of the trolley instead of on the same side.

In the case of FIGS. 9-11 the transmission for connection between the steering unit 2 and the steering wheels WL comprises a front transmission member 10 and a rear transmission member 9 that are constituted by gears rotatably mounted under the frames 32 and 31, which turn about vertical axes 12 and 11 and are connected to one another by a chain 130 arranged to form a figure eight. The front wheel 10 is fixed in rotation about the axis 12 with respect to the steering control unit 2. Moreover, the rotation of the wheels 10 and 9 is transmitted to the steering wheels WL by means of two respective chains 60 and 80 that engage gears (not visible in the figures) carried by the wheel units WL.

Thanks to the aforesaid structure and arrangement, a steering manoeuvre governed by the unit 2 determines a rotation in opposite directions of the two steering wheels WL, which consequently remain both aligned with the curved path to be followed. The two freely pivotable wheels WR consequently line up since in any case they have their respective vertical axes of oscillation that are staggered horizontally with respect to the centres of the wheels.

In addition, the aforesaid arrangement is such that an oscillation of 90° of the aforesaid control unit 2 with respect to a neutral position of alignment of the wheel units in the longitudinal direction causes an oscillation of 90° of the steering wheel units WL to enable an advance of the trolley in said transverse direction T (see in FIG. 10 the position rotated through 90° of the unit 2 illustrated with dashed lines). In the condition rotated through 90° the unit can be blocked by means of a clamping device of any known type.

The cross-over between the two branches of the chain 130 arranged to form a figure eight is allowed in so far as one of the two branches includes a stretch defined by two parallel plates 130a between which there passes the other branch of chain, the arrangement being such that the plates 130a never reach the wheel 9 or the wheel 10.

Of course, when the trolley has to be adapted to a different length, the chain 130 must be replaced completely or modified with the addition or the elimination of links of the chain.

Instead of the chains 130, 60, 80, it is also possible to use belts, for example, toothed belts, co-operating with pulleys.

It should moreover be noted that FIG. 10, which illustrates the trolley 1 in the configuration of maximum extension, refers to an embodiment that is conceptually identical to, but constructively different from, that of FIGS. 9 and 11. In the latter figures, the longitudinal arms 31L, 32L of the rear and front frames 31, 32 are arranged above the two central longitudinal elements 30a, whereas in the case of the embodiment of FIG. 10 they are arranged on the two outer sides of the elements 30a. As has been mentioned, the two solutions are in any case substantially identical to one another.

Naturally, without prejudice to the principle of the invention, the details of construction and the embodiments may vary widely with respect to what has been described and illustrated purely by way of example herein, without thereby departing from the scope of the present invention.

In particular, the specific structure and conformation of the trolley can differ widely from the example illustrated, without prejudice to the characteristic of the possibility of adjusting the length of the trolley in the longitudinal direction and adjusting the position of the supports AL in the transverse direction. For example, the two front and rear frames could be slidably mounted directly on top of one another, without providing a central structure arranged between them.

The invention claimed is:

1. A trolley for conveying containers for pieces or components in an industrial plant, comprising:
    a structure (3) provided with a plurality of wheel units (W), at least two of the plurality of wheel units (W) are pivotable about respective vertical axes;
    a steering control unit (2) of the trolley (1) located at a front end of the trolley and connected to the structure (3) of the trolley (1) the steering control unit (2) being oriented about a vertical axis (12) that lies in a longitudinal median plane (m) of the trolley;
    a transmission (5, 6, 7, 8, 9, 10), which connects said steering control unit (2) of the trolley (1) to at least two of said wheel units (W); and
    one or more locating supports (AL, AF, AR) connected to and arranged on said trolley structure (3), for locating in position a container for pieces (C) on said structure (3),
    said trolley being characterized in that:
    said trolley structure (3) is adjustable in a length in a longitudinal direction (L) of the trolley; and
    said locating supports include lateral locating supports (AL) that are adjustable in position in a transverse direction (T), orthogonal to said longitudinal direction (L),
    in such a way that said trolley (1) can be adapted to containers for the pieces (C) having dimensions and/or configurations different both with reference to said longitudinal direction (L) and with reference to said transverse direction (T),
    said trolley structure (3) comprising:
    a front frame (32) and a rear frame (31), which are slidably mounted towards and away from each other in said longitudinal direction (L) and can be removably and selectively locked in different positions, in which they are at different distances from one another so as to define different lengths of said trolley (1) in said longitudinal direction (L),
    wherein said wheel units (W) are carried by said front and rear frames (31, 32,);
    wherein said steering control unit (2) of the trolley (1) is connected to at least one of said front frame and rear frame (32, 31); and
    wherein said lateral locating supports (AL) are slidably mounted on said front and rear frames (32, 31) in said transverse direction (T) and can be selectively and removably locked in a plurality of different adjustment positions to adapt to different dimensions of the container (C) in the aforesaid transverse direction (T).

2. The trolley according to claim 1, characterized in that said front and rear frames (32, 31) are both slidably mounted on a common central structure (30).

3. The trolley according to claim 2, characterized in that:
    the central structure (30) comprises two parallel longitudinal elements (30a) arranged at a distance apart; and each of said front and rear frames (32, 31) comprises two longitudinal arms (311, 312; 321, 322) slidably mounted on said longitudinal elements (30a) of the central structure (30) and one or more cross members (313-316; 323-326) connected to said longitudinal arms.

4. The trolley according to claim 3, characterized in that the longitudinal elements (30a) of the central structure have a distribution of holes (F) that can be engaged selectively by fixing bolts (B) to connect said longitudinal elements rigidly to said longitudinal arms (311 312; 321, 322) of the two frames (32, 31).

5. The trolley according to claim 3, characterized in that the lateral locating supports (AL) are slidably mounted on respective cross members (315, 325) of the two adjustable frames, and in that said cross members each have a distribution of through holes (H) that can be engaged selectively by fixing bolts (S) of the respective lateral locating support (AL).

6. The trolley according to claim 3, characterized in that the aforesaid cross members of the front and rear frames (32, 31) project at the two sides of the two respective longitudinal arms (32L, 31L) in such a way that each of said front and rear frames has in plan view a general T-shaped configuration so as to define a free space at the two sides of the central structure (30) of the trolley, between the two heads of the T shapes of the front and rear frames (32, 31).

7. The trolley according to claim 1, further comprising at least one front locating support (AF) and at least one rear locating support (AR) carried, respectively, by said front and rear frames (32, 31) in a fixed position on said frames.

8. The trolley according to claim 1, characterized in that it has two wheel units (WR), arranged on a first side with respect to the longitudinal median plane (m) of the trolley (1) and carried, respectively, by said front and rear frames (32, 31), and two wheel units (WL) arranged on a second side and carried, respectively, by said front and rear frames (32, 31), and in that at least one wheel unit (WL, WR) carried by the front frame (32) and at least one wheel unit (WL, WR) carried by the rear frame (31) are steering wheel units, in so far as they are connected by said transmission to said steering control unit of the trolley, in such a way that their oscillation about the respective vertical axes is controlled by said control unit.

9. The trolley according to claim 8, characterized in that the two aforesaid steering wheel units are arranged on one and the same side or on opposite sides with respect to the longitudinal median plane (m) of the trolley and in that the other two wheel units (WR) are freely pivotable.

10. The trolley according to claim 8, characterized in that said transmission is shaped in such a way that an oscillation of the steering control unit (2) in a given direction causes oscillations in mutually opposite directions of the two steering wheel units (WL) and in such a way that an oscillation of 90° of the aforesaid control unit (2) with respect to a neutral position of alignment of the wheel units in the longitudinal direction causes an oscillation of 90° of the steering wheel units (WL) to enable advance of the trolley in said transverse direction (T).

11. The trolley according to claim 8, characterized in that said transmission comprises:

a front transmission member (10), pivotably mounted on said front frame (32) about said vertical axis (12) of said steering control unit (2) and fixed in rotation with respect to said control unit;

a rear transmission member (9), pivotably mounted on said rear frame (31) about a respective vertical axis (11);

a first transmission member and a second transmission member (5, 6, 7, 8; 60, 80), which connect, respectively, said front and rear transmission members (32, 31) to at least two front and rear steering wheel units (WL); and an intermediate transmission member (13; 130), connected to said front and rear transmission members (9, 10), reversing the direction of rotation of the rear member (9) with respect to the front member (10).

12. The trolley according to claim 11, characterized in that said front and rear transmission members are at least one of gears or pulleys (10, 9) and in that said first and second transmission means are at least one of chains or belts (60, 80) that connect said gears or pulleys to further gears or pulleys, which are carried, respectively, by the two steering wheel units (WL), and in that said intermediate transmission means is constituted by at least one of a chain or belt (130) arranged to form a figure eight, which connects the front and rear transmission members (10, 9) together.

13. The trolley of claim 1 wherein the at least two wheels pivotable about respective vertical axes comprises four wheels each pivotable about respective vertical axes.

* * * * *